(12) United States Patent
Buisman et al.

(10) Patent No.: US 7,203,663 B1
(45) Date of Patent: Apr. 10, 2007

(54) SYSTEM AND METHOD FOR CONVERTING INFORMATION ON PAPER FORMS TO ELECTRONIC DATA

(75) Inventors: William J. Buisman, Lebanon, TN (US); Gary Cohen, Broomall, PA (US); Steven R. Fox, Laurel Springs, NJ (US); Charles Kruse, Bear, DE (US); Christine Sulpizio, Chadds Ford, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 399 days.

(21) Appl. No.: 09/597,297

(22) Filed: Jun. 20, 2000

Related U.S. Application Data (60) Provisional application No. 60/182,674, filed on Feb. 15, 2000.

(51) Int. Cl.
*G06Q 40/00* (2006.01)
(52) U.S. Cl. .................................................. 705/38
(58) Field of Classification Search ............. 705/35–40
See application file for complete search history.

(56) References Cited

U.S. PATENT DOCUMENTS

| | | | |
|---|---|---|---|
| 3,316,395 A | 4/1967 | Lavin | |
| 3,896,266 A | 7/1975 | Waterbury | 179/1 |
| 4,396,985 A | 8/1983 | Ohara | 364/405 |
| 4,523,297 A | 6/1985 | Ugon et al. | 364/900 |
| 4,594,663 A | 6/1986 | Nagata et al. | |
| 4,736,294 A | 4/1988 | Gill et al. | 364/408 |
| 4,812,628 A | 3/1989 | Boston et al. | 235/380 |
| 4,831,526 A | 5/1989 | Luchs et al. | 364/401 |
| 4,866,634 A | 9/1989 | Reboh | |
| 4,914,587 A | 4/1990 | Clouse | 364/408 |
| 4,916,296 A | 4/1990 | Streck | 235/454 |
| 4,999,617 A | 3/1991 | Uemura et al. | 340/706 |
| 5,047,614 A | 9/1991 | Bianco | 235/385 |
| 5,054,096 A | 10/1991 | Beizer | 382/41 |

(Continued)

FOREIGN PATENT DOCUMENTS

| | | |
|---|---|---|
| JP | 2001266039 | 9/2001 |
| JP | 2002024618 | 1/2002 |

OTHER PUBLICATIONS www.asvsolgrp.com/icr.htm.*
Cardiff, Teleform Elite, copyright 1991-2000.*
Car Loans in Minutes, Bank Management vol. 64, No. 4, Apr. 1, 1993.

(Continued)

*Primary Examiner*—James P. Trammell
(74) *Attorney, Agent, or Firm*—Hunton & Williams LLP (57) ABSTRACT

The invention is a system and method for converting paper forms to electronic data. More specifically, a special purpose system and technique are described for performing the conversion in a manner that is advantageous in terms of overall cost and cycle time. The approach is applicable to many different form types; the forms may be credit card applications, license applications, or tax returns, for example. Because present day scanners and character recognition algorithms still result in read errors, manual data correction is required. One technique described in the invention is how to efficiently use both internal and external data entry operators as part of an overall conversion process. The invention also illustrates how to apply contingent workflow management concepts to the data conversion process. The result is a more efficient and effective business process.

17 Claims, 5 Drawing Sheets

U.S. PATENT DOCUMENTS

| | | | |
|---|---|---|---|
| 5,175,682 A | 12/1992 | Higashiyama et al. | 364/408 |
| 5,206,803 A | 4/1993 | Vitagliano | |
| 5,237,620 A | 8/1993 | Deaton et al. | 382/7 |
| 5,239,462 A | 8/1993 | Jones | |
| 5,241,161 A | 8/1993 | Zuta | 235/382 |
| 5,249,044 A | 9/1993 | Von Kohorn | 358/86 |
| 5,252,815 A | 10/1993 | Pernet | 235/441 |
| 5,262,860 A | 11/1993 | Fitzpatrick et al. | 358/142 |
| 5,262,941 A | 11/1993 | Saladin | |
| 5,274,547 A | 12/1993 | Zoffel | |
| 5,308,959 A | 5/1994 | Cherry | 235/379 |
| 5,339,239 A | 8/1994 | Manabe et al. | 364/401 |
| 5,367,581 A | 11/1994 | Abel et al. | 382/64 |
| 5,380,991 A | 1/1995 | Valencia et al. | 235/383 |
| 5,396,417 A | 3/1995 | Burks et al. | 364/401 |
| 5,396,650 A | 3/1995 | Terauchi | 455/38.2 |
| 5,424,938 A | 6/1995 | Wagner | |
| 5,438,186 A | 8/1995 | Nair et al. | 235/449 |
| 5,444,616 A | 8/1995 | Nair et al. | 364/405 |
| 5,450,134 A | 9/1995 | Legate | 348/467 |
| 5,479,532 A | 12/1995 | Abel et al. | 382/137 |
| 5,488,571 A | 1/1996 | Jacobs et al. | 364/705.07 |
| 5,506,394 A | 4/1996 | Plesko | 235/472 |
| 5,508,731 A | 4/1996 | Kohorn | 348/1 |
| 5,523,794 A | 6/1996 | Mankovitz et al. | 348/460 |
| 5,535,147 A | 7/1996 | Jacobs et al. | 364/705.07 |
| 5,537,315 A | 7/1996 | Mitcham | |
| 5,544,040 A | 8/1996 | Gerbaulet | 364/401 R |
| 5,550,734 A | 8/1996 | Tarter et al. | 364/401 |
| 5,557,334 A | 9/1996 | Legate | 348/473 |
| 5,594,493 A | 1/1997 | Nemirofsky | 348/13 |
| 5,604,542 A | 2/1997 | Dedrick | 348/552 |
| 5,611,052 A | 3/1997 | Dykstra et al. | 395/238 |
| 5,652,602 A | 7/1997 | Fishman et al. | 345/156 |
| 5,655,085 A | 8/1997 | Ryan et al. | 364/401 |
| 5,663,766 A | 9/1997 | Sizer, II | 348/473 |
| 5,664,110 A | 9/1997 | Green et al. | 705/26 |
| 5,665,953 A | 9/1997 | Mazzamuto et al. | 235/383 |
| 5,692,132 A | 11/1997 | Hogan | 395/227 |
| 5,696,907 A | 12/1997 | Tom | |
| 5,699,527 A | 12/1997 | Davidson | |
| 5,727,153 A | 3/1998 | Powell | 395/214 |
| 5,728,998 A | 3/1998 | Novis et al. | 235/380 |
| 5,734,154 A | 3/1998 | Jachimowicz et al. | 235/492 |
| 5,736,727 A | 4/1998 | Nakata et al. | 235/487 |
| 5,742,775 A | 4/1998 | King | 395/238 |
| 5,744,789 A | 4/1998 | Kashi | 235/472 |
| 5,751,953 A | 5/1998 | Shiels et al. | 395/200.09 |
| 5,763,862 A | 6/1998 | Jachimowicz et al. | 235/380 |
| 5,765,144 A | 6/1998 | Larche et al. | 705/38 |
| 5,767,896 A | 6/1998 | Nemirofsky | 348/13 |
| 5,774,882 A | 6/1998 | Keen | |
| 5,797,133 A | 8/1998 | Jones | |
| 5,804,806 A | 9/1998 | Haddad et al. | 235/383 |
| 5,806,044 A | 9/1998 | Powell | 705/14 |
| 5,809,478 A | 9/1998 | Greco | |
| 5,815,127 A | 9/1998 | Jacobs et al. | 345/2 |
| 5,832,447 A | 11/1998 | Rieker et al. | 705/2 |
| 5,832,463 A | 11/1998 | Funk | 705/35 |
| 5,845,256 A | 12/1998 | Pescitelli | |
| 5,854,595 A | 12/1998 | Williams | 340/825.44 |
| 5,870,155 A | 2/1999 | Erlin | 348/734 |
| 5,870,721 A | 2/1999 | Norris | 705/38 |
| 5,870,723 A | 2/1999 | Pare | |
| 5,873,096 A | 2/1999 | Lim et al. | 707/201 |
| 5,878,403 A | 3/1999 | DeFrancesco et al. | |
| 5,880,452 A | 3/1999 | Plesko | 235/472 |
| 5,880,769 A | 3/1999 | Nemirofsky et al. | 348/12 |
| 5,897,621 A | 4/1999 | Boesch | |
| 5,897,625 A | 4/1999 | Gustin et al. | 705/43 |
| 5,898,157 A | 4/1999 | Mangili et al. | 235/380 |
| 5,910,988 A | 6/1999 | Ballard | |
| 5,911,135 A | 6/1999 | Atkins | |
| 5,913,202 A | 6/1999 | Motoyama | 705/35 |
| 5,926,800 A | 7/1999 | Baronowski et al. | 705/35 |
| 5,930,217 A | 7/1999 | Kayanuma | 369/59 |
| 5,930,764 A | 7/1999 | Melchione et al. | 705/10 |
| 5,930,776 A | 7/1999 | Dykstra | |
| 5,940,811 A | 8/1999 | Norris | 705/38 |
| 5,940,812 A | 8/1999 | Tengel et al. | 705/38 |
| 5,963,953 A | 10/1999 | Cram et al. | 707/102 |
| 5,966,699 A | 10/1999 | Zandi | |
| 5,970,483 A | 10/1999 | Evans | |
| 5,983,206 A | 11/1999 | Oppenheimer | |
| 5,987,436 A | 11/1999 | Halbrook | |
| 5,995,947 A | 11/1999 | Fraser | |
| 6,012,044 A | 1/2000 | Maggioncalda | |
| 6,014,646 A | 1/2000 | Vallee | |
| 6,029,149 A | 2/2000 | Dykstra et al. | 705/38 |
| 6,032,137 A | 2/2000 | Ballard | |
| 6,055,517 A | 4/2000 | Friend | |
| 6,078,905 A | 6/2000 | Pich-LeWinter | |
| 6,108,644 A | 8/2000 | Goldschlag | |
| 6,128,603 A | 10/2000 | Dent | |
| 6,216,115 B1 | 4/2001 | Barrameda | |
| 6,339,766 B1 | 1/2002 | Gephart | |
| 6,343,279 B1 | 1/2002 | Bissonette | |
| 2001/0011255 A1 | 8/2001 | Asay | |
| 2001/0042034 A1 | 11/2001 | Elliott | |
| 2001/0047313 A1 | 11/2001 | Kanai | |
| 2001/0047489 A1 | 11/2001 | Ito | |
| 2002/0013728 A1 | 1/2002 | Wilkman | |
| 2002/0038363 A1 | 3/2002 | Maclean | |
| 2002/0048369 A1 | 4/2002 | Ginter | |
| 2002/0052842 A1 | 5/2002 | Schuba | |
| 2002/0062285 A1 | 5/2002 | Amann | |
| 2002/0087468 A1 | 7/2002 | Ganesan | |
| 2002/0091635 A1 | 7/2002 | Dilip | |

OTHER PUBLICATIONS

"Car Loans in Minutes," by Anonymous, *Bank Management,* Apr. 1993, v 69, n 4, p. A23.

"Collections Strategy Model Phase II," Proposal by Mike Alexander et al. of Applied Decision Analysis, Inc., Aug. 7, 1996.

"Competing in Auto Lending," by Phil Britt, *America's Community Banker,* Nov. 1996, v 5, n 11, pp. 33-37.

"Credit Scoring Digs Deeper Into Data," by Marc Friedland, *Credit World,* May 1996, v 84, n 5, pp. 19-23.

"Expanding Risk Management Strategies: Key to Future Survival," by Ron Jameson, *Credit World,* v 84, n 5, pp. 16-18.

"Fannie Mae on the Web," by Maize Kennedy, *Newsbytes,* May 8, 1995.

"OFT Gives the Individual Top Priority Report Calls for Deregulation of Business Lending," by Vanessa Houlder, *The Financial Times,* Jun. 8, 1994.

"Operations Research," Spring 1975 Bulletin from *The Operations Research Society of America,* Chicago, IL, Apr. 30-May 2, 1975.

"Scoring Borrower Risk," by Deidre Sullivan, *Mortgage Banking,* Nov. 1994, v 55, n2, pp. 94-98.

"There Must Be a Better Way," by Fred Portner, *Mortgage Banking,* Nov. 1992, v 53, n 2, pp. 12-22.

"Using Software To Soften Big-Time Competition," by Michael Hickman, *Bank Systems Technology,* Jun. 1994, v 31, n 8, pp. 38-40.

"Dutch Software Concern Experiments with Electronic 'Cash' in Cyberspace"; by Kim A. Strassell, Staff Reporter; The Wall Street Journal; 1 page.

http://www.cgk.de/english/allfont.htm (visited Feb. 17, 2000.
http://www.formspro.com/ (visited Feb. 17, 2000).
http://www.miteksys.com/whtpaper.html (visited Feb. 17, 2000).

\* cited by examiner

SYSTEM AND METHOD FOR CONVERTING INFORMATION ON PAPER FORMS TO ELECTRONIC DATA

CROSS-REFERENCE TO RELATED APPLICATIONS

The subject matter of this application is related to the subject matter of provisional U.S. Patent Application Ser. No. 60/182,674 filed Feb. 15, 2000 entitled "SYSTEM AND METHOD FOR PROCESSING AND TRACKING APPLICATIONS FOR FINANCIAL PRODUCTS AND SERVICES," which application is assigned or under obligation of assignment to the same assignee as this application and which is incorporated by reference herein, and priority being claimed therefrom.

FIELD OF THE INVENTION

The invention relates generally to a system and method for processing data, and more specifically for converting information on paper forms to electronic data which can be utilized by subsequent processes.

BACKGROUND OF THE INVENTION

Many commercial and government entities receive input data in paper format. Credit card applications, license applications, and tax returns are examples. Although input techniques such as automated telephone systems and Web-based utilities are increasingly provided as an input alternative, the volume of input made in paper format is still substantial. For instance, a bank or other financial institution may receive more than 10,000 credit card applications in paper format in a single day. Manual entry of this volume of data into data processing systems may be cost prohibitive.

A common technique for processing such a large volume of input forms involves automated or semi-automated conversion of the completed paper forms to electronic format. In a typical approach, paper forms are first scanned by a digital image scanner to yield an electronic bitmap image. The image is then converted to text via Optical Character Recognition (OCR) software (for reading machine printed characters) and Intelligent Character Recognition (ICR) software (for reading hand written characters). Not all data is correctly interpreted, however, due to functional limitations in scanning apparatus and recognition software. It is therefore common practice to employ data entry operators for the purpose of correcting errors or omissions resulting from the automated conversion process. For an example of such a system and method, see U.S. Pat. No. 5,054,096 issued to Beizer on Oct. 1, 1991.

Known approaches have several drawbacks and limitations, however. One issue not addressed by existing technology is how to manage the cost and cycle time associated with data entry staff. Another limitation is a failure to recognize that it may be advantages to process some applications differently than others, according to a variety of factors.

In sum, existing systems and techniques for converting information on paper forms to electronic data have not adequately managed the conversion process. The resulting lack of efficiency, and other drawbacks, limit the utility of such systems for entities receiving a high volume of input data in paper format.

SUMMARY OF THE INVENTION

The invention overcoming these and other drawbacks in the art relates a system and method for converting credit card applications and other forms to electronic format. The system and method may operate on full forms or only portions (or snippets) of the forms, which are later reassembled. In one embodiment, conversion processing may be accomplished through the selective use of internal and external data entry operators. Work may also be prioritized according to its importance to the processing entity.

It is an object of the invention to reduce the cost and cycle time associated with the conversion process from paper format to electronic data format.

It is another object of the invention to enable an entity using the conversion process to tailor the work flow to the needs of their organization.

The following drawings and descriptions further describe the invention, including different embodiments of the major system components and processes. The construction of such a system, implementation of such a process, and advantages will be clear to a person skilled in the art of document conversion.

DETAILED DESCRIPTION OF THE INVENTION

Figure 1:
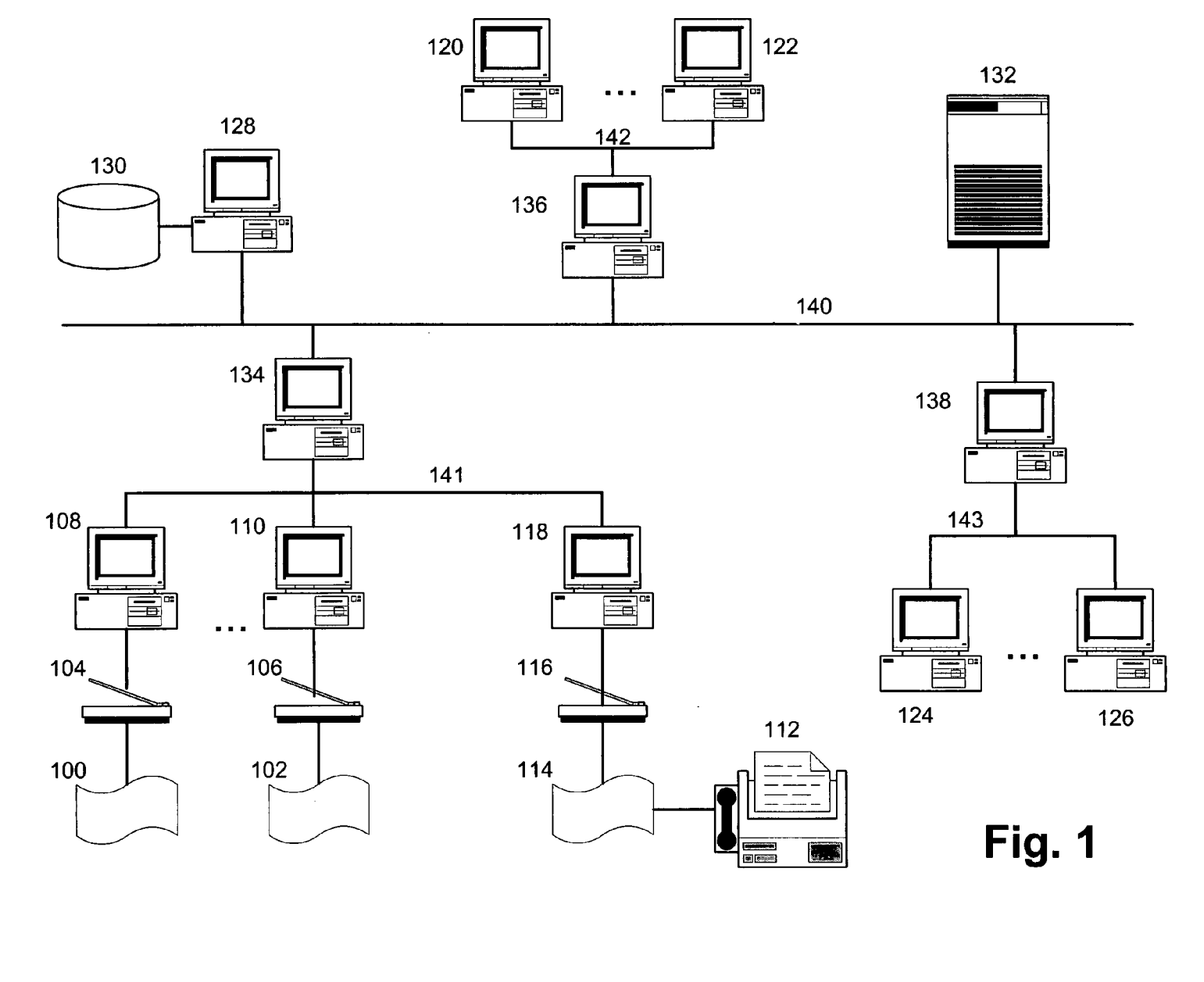
FIG. 1 is schematic diagram of a system configured for the conversion of paper forms into electronic data, according to one embodiment of the invention.

FIG. 1 is schematic diagram of the system, according to one embodiment of the invention. The diagram illustrates an overall architecture for conversion processing, including: paper forms 100, 102, and 114; a facsimile machine 112; image scanners 104, 106, and 116; servers 128, 132, 134, 136, and 138; database 130; clients 108, 110, 118, 120, 122, 124, and 126; and communication links 140, 141, 142, and 143.

Paper forms 100 and 102 may be received via an intake service, such as a mail delivery service. Paper form 114 is the output from facsimile machine 112. Paper forms 100, 102, and 114 may be imaged by digital image scanners 104, 106, and 116 or other image generator. Optical Character Recognition (OCR) and Intelligent Character Recognition (ICR) software, which may be resident on imaging devices 104, 106, and 116 or on input clients 108, 110, and 118, may convert the images into alpha-numeric text. The system may include internal data entry clients 120 and 122, and may also include external data entry clients 124 and 126.

Clients 108, 110, 118, 120, 122, 124, and 126 may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Clients 108, 110, 118, 120, 122, 124, and 126 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Clients 108, 110, 118, 120, 122, 124, and 126 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Clients 108, 110, 118, 120, 122, 124, and 126 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device.

Server 128 may control access to database 130, and may also control work flow between servers 132, 134, 136, and 138. Servers 128, 132, 134, 136, and 138 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Clients 108, 110, 118, 120, 122, 124, and 126, and servers 128, 132, 134, 136, and 138 may utilize network enabled code to exchange data or instructions over communications links 140, 141, 142, and 143. The network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Java™, Jini™, C, C++, Perl, UNIX Shell, Visual Basic or Visual Basic Script, Virtual Reality Markup Language (VRML) or other compilers, assemblers, interpreters or other computer languages or platforms.

Communications links 140, 141, 142, and 143 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Communications links 140, 141, 142, and 143 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications links 140, 141, 142, and 143 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

The database 130 may be, include or interface to, for example, the Oracle™ relational database sold commercially by Oracle Corp. Other databases, such as Informix™, DB2 (Database 2) or other data storage or query formats, platforms or resources such as OLAP (On Line Analytical Processing), SQL (Standard Query Language), a storage area network (SAN), Microsoft Access™ or others may also be used, incorporated or accessed in the invention.

Figure 2:
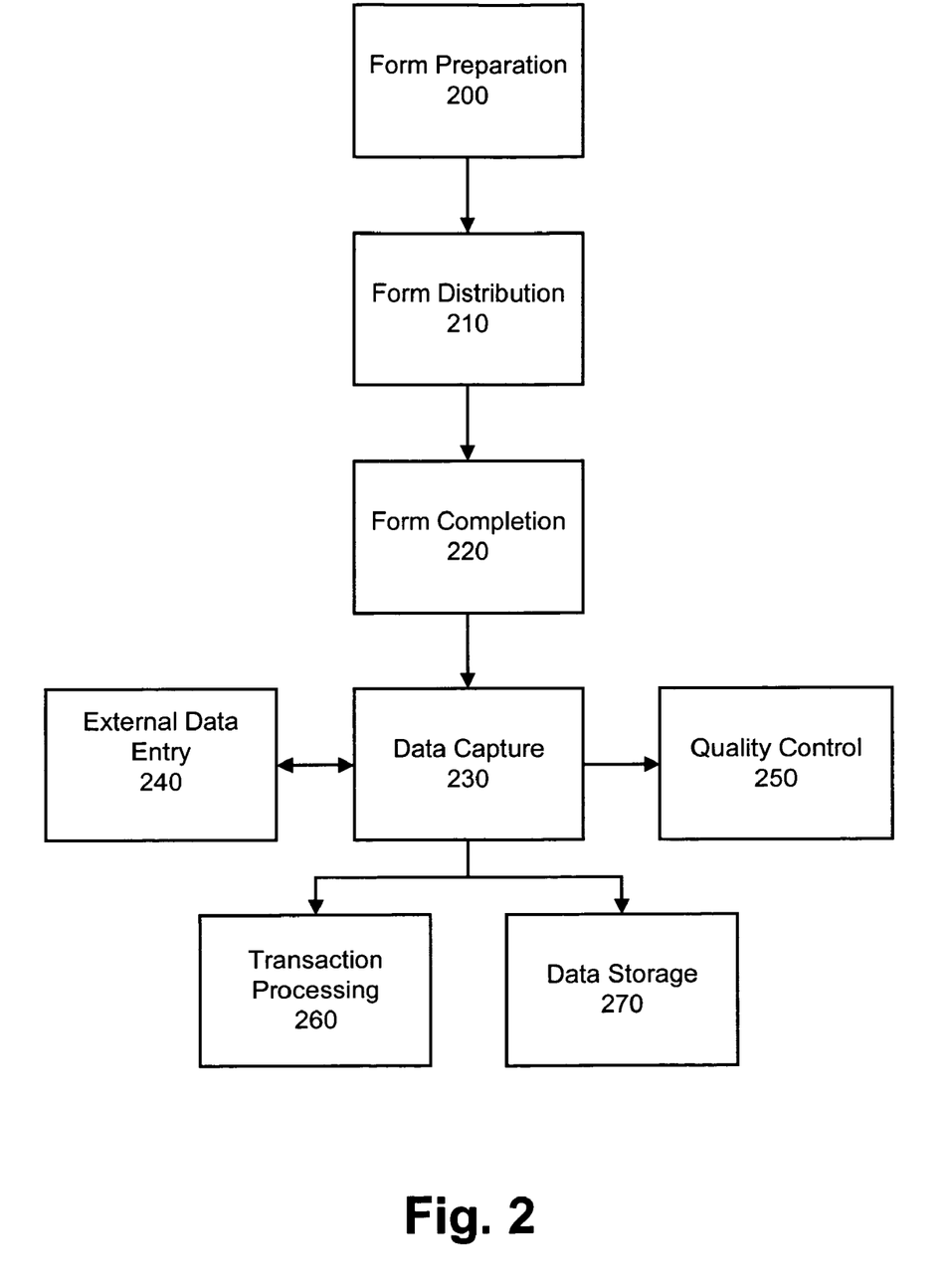
FIG. 2 is a high-level flow diagram for forms-based processing, according to one embodiment of the invention.

FIG. 2 is a high-level flow diagram for processing of financial applications or other forms, according to one embodiment of the invention. The illustrated process begins with form preparation 200, which is further described by FIG. 3. Form distribution 210 may involve, for example, delivery of forms to existing or potential customers. Form distribution 210 may be accomplished by direct mail, by placement on countertop or rack, or by other suitable procedure. Form completion 220 may be satisfied with handwritten data entry onto the form, by using a pen or pencil, for example. Form completion 220 may also involve machine-aided data entry such as use of a typewriter or electromechanical printer. The data capture process 230 converts data added to the form into electronic format, and is further illustrated in FIG. 4. The data capture process 230 may be internal to an organization, and may be supplemented with external data entry 240. The type and frequency of errors related to data capture process 230 may be continuously monitored or periodically audited by a quality control function 250. One use of the data capture process 230 may be to enable transaction processing 260, such as automated review of credit card applications. The output of data capture process 230 may also be exploited by a data storage process 270 to create a useful database.

Figure 3:
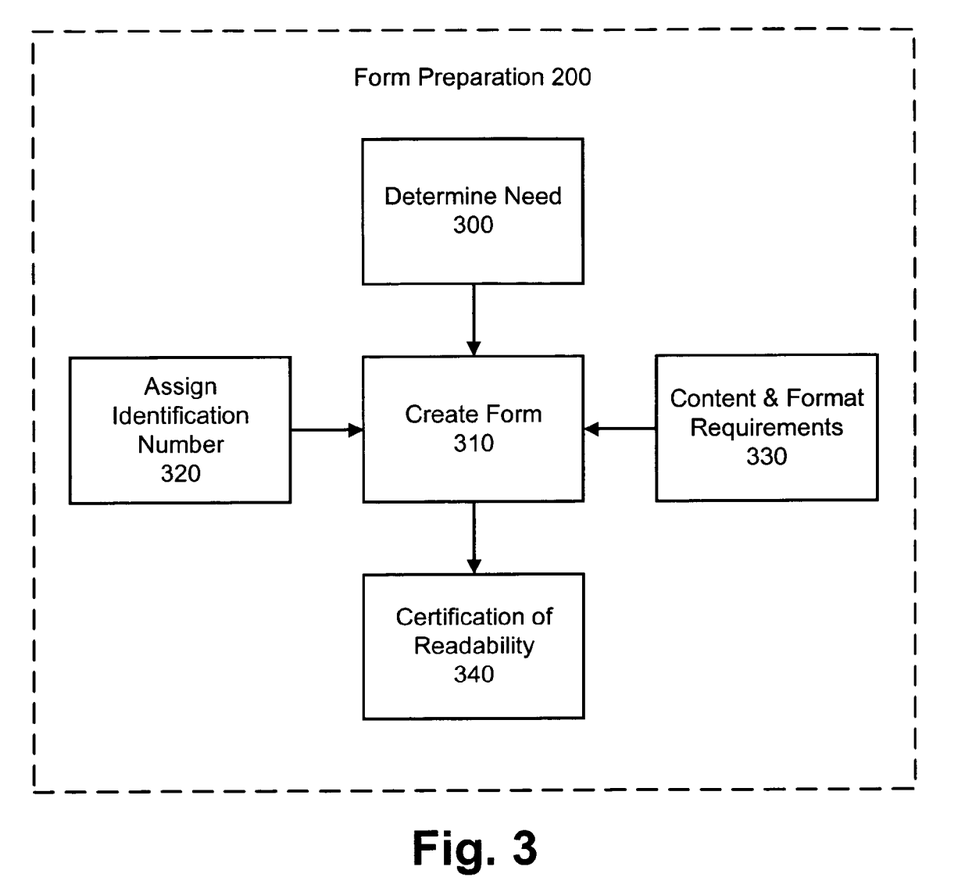
FIG. 3 is a more detailed flow diagram of form preparation, according to one embodiment of the invention.

FIG. 3 is a more detailed flow diagram of form preparation 200, according to one embodiment of the invention. The diagram illustrates that a new form is created 310 only after determination of a need 300. The form creation process 310 may receive an assigned identification number 320 as an input. Identification number 320 may appear on the resulting form as printed text, or it may be encoded in machine-readable format such as a barcode. The form creation process 310 may be further constrained by certain content and format requirements 330. A content requirement might be, for example, that all forms include the name and address of the form provider and request the name and address of the person completing the form. Format restrictions may include requirements such as font type, minimum character size, and line spacing. Before the form preparation step 200 is considered complete, an entity may require that a sample form be tested for readability 340, for example with existing scanner hardware and character recognition software.

Figure 4:
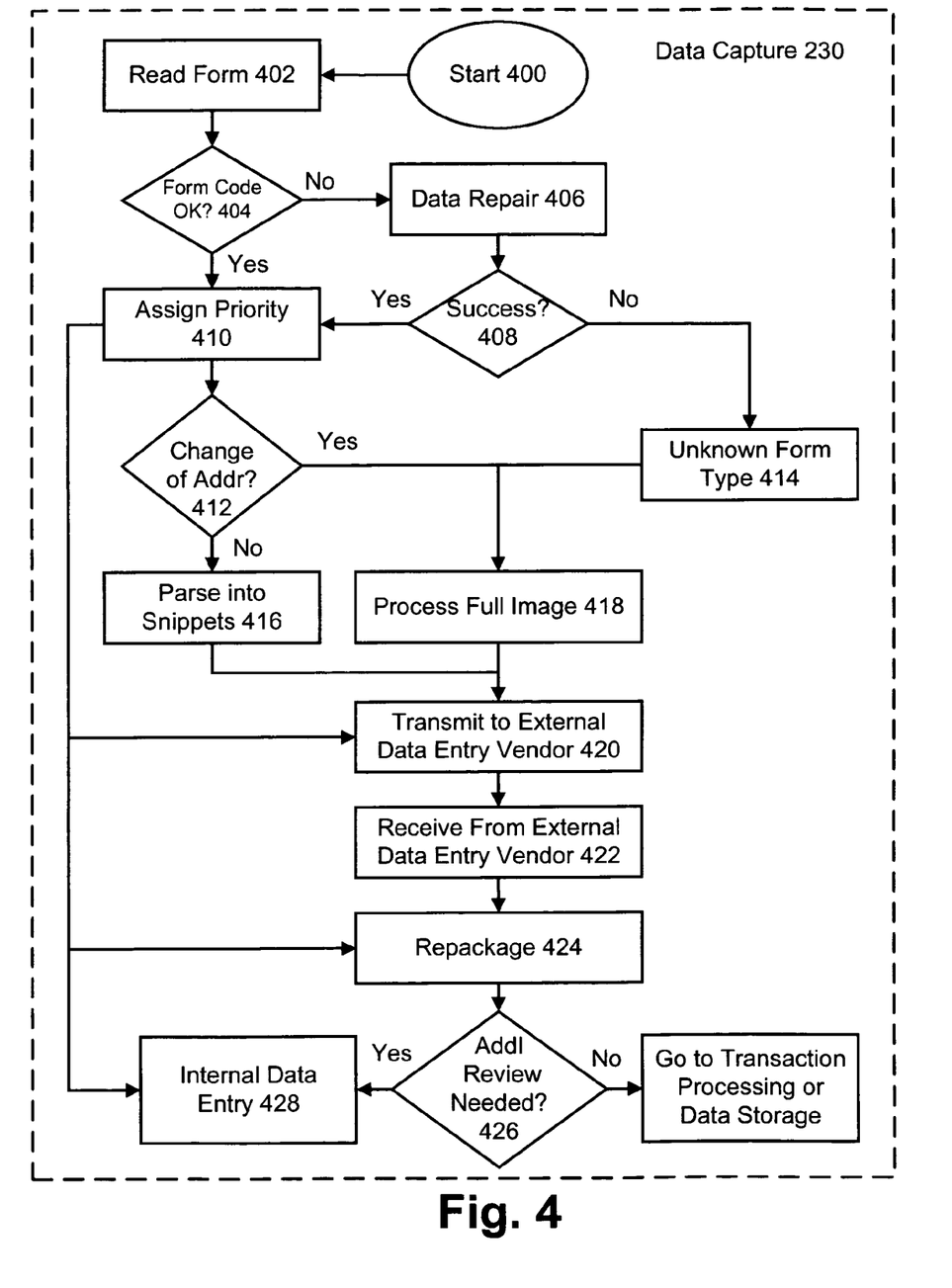
FIG. 4 is a more detailed flow diagram of data capture, according to one embodiment of the invention.

FIG. 4 is a more detailed flow diagram of data capture process 230, according to one embodiment of the invention. The process starts 400 with receipt of a completed form. The first step is to scan or otherwise read the form 402, converting the form and all data contained thereon into electronic format. This may be accomplished via digital image scanners 104, bar code readers, Optical Character Recognition (OCR) software, Intelligent Character Recognition (ICR) software, or through similar reading techniques known to data conversion practitioners.

Processing may be contingent on the outcome 404 of the read 402. A form code identifies the particular type of form. If the form code was successfully interpreted, then a priority may be assigned to the form in step 410. Assignment of priority may be based, for example, on a preferred client list, according to the profit margin that a seller of goods or services expects to receive from a buyer, or according to other criteria. The priority assigned in step 410 may be represented on a scale of 1 to 10, designated by high, medium, or low, or otherwise rank ordered. If the form code read was not successful in step 402, then the form may be routed to data repair 406 for manual classification of the incoming form type.

Work flow may be further contingent on whether data repair 406 was successful 408. If data repair 406 was a success, for example where the form code was human-readable, then the form is promoted to step 410 for assignment of priority. If, on the other hand, data repair 406 was not successful in determining the form code, then the form may be designated as an unknown form type 414.

After forms have been assigned a priority 410, they may be reviewed for change of address 412. Change of address may be detected by a box that has been checked, for example, or by the presence of text outside of defined data input areas. Where a change of address has not been detected, the form may be routed by decision process 412 to parsing process 416. An unknown form 414, or a form with a change of address 412, may be processed as a full image 418.

Figure 5:
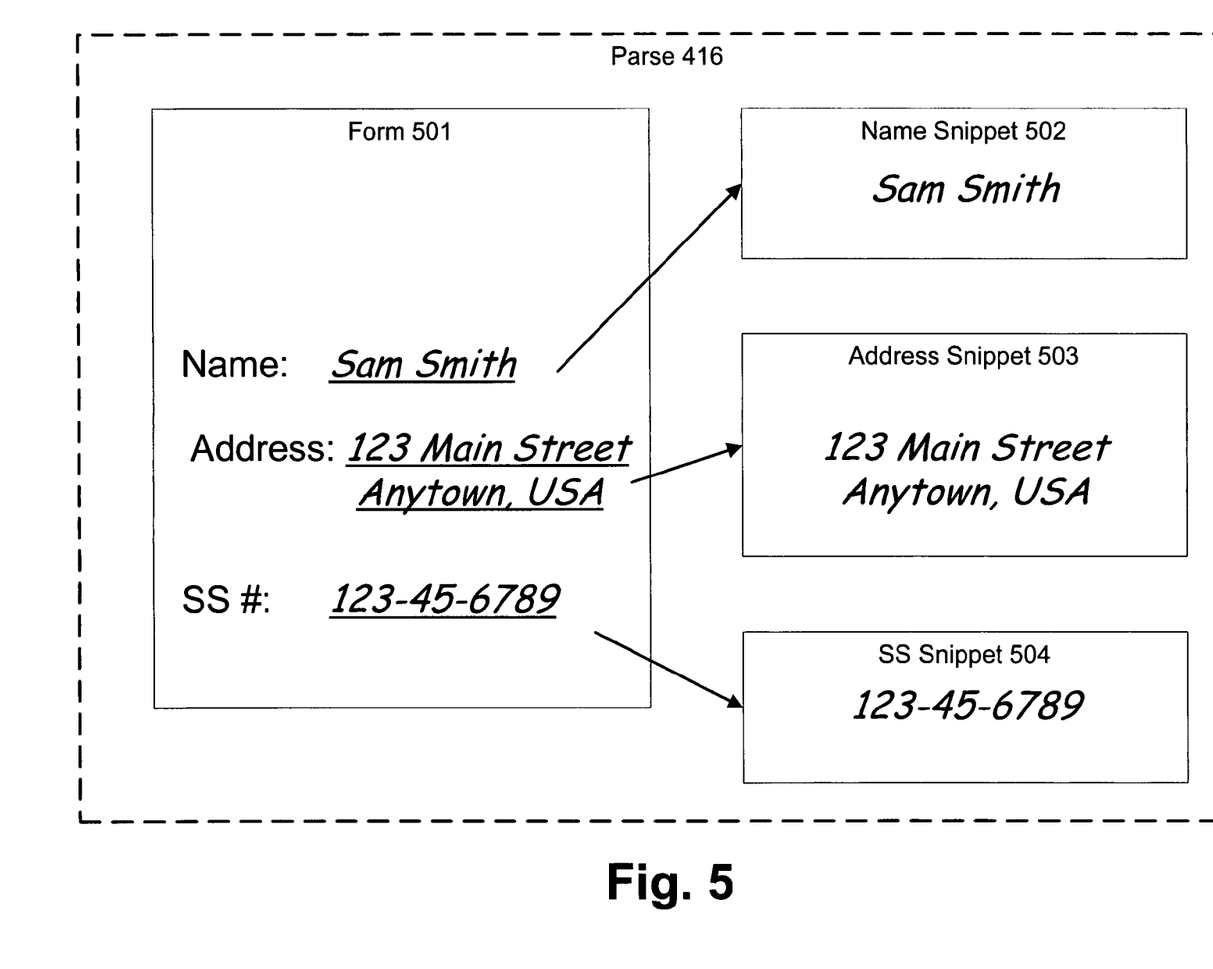
FIG. 5 is a schematic diagram illustrating how a form is parsed into snippets, according to one embodiment of the invention.

Parsing 416 decomposes form data into snippets. FIG. 5 illustrates a form 501 that has been parsed into a Name Snippet 502, an Address Snippet 503, and a Social. Security Number Snippet 504. Subsequent processing of parsed data is advantageous because a majority of snippet types are common to different form types. The result is that new form types are easily introduced into the semi-automated data capture process 230. Another advantage of snippet processing is information security. For instance, a data entry operator verifying data originally contained on form 501 is not able to associate the social security number with a name: the data entry operator is merely processing a series of unassociated name and social security number snippets.

The daily volume of forms received 400 for data capture 230 may vary substantially. For this and other reasons, it may be advantageous to utilize external data entry vendors 240 capable of processing either parsed 416 or full image forms 418. FIG. 4 therefore indicates that electronic form data may be transmitted 420 to external data entry vendors for the purpose of verifying the automated read 402. External data entry 240 may involve, for example, an on-screen comparison between a bit mapped image of a snippet or full image and the textual equivalent produced by character recognition software. After external data entry 240, the system may receive 422 snippets or full images from the external data entry vendor. In the case of snippet processing by external data entry vendors 240, the data is repackaged 424 so that snippets are re-associated according to original format received in step 400.

When form data is received from external data entry vendors 422, and repackaged 424 if necessary, a decision 426 may be made as to the need for review by internal data entry operators 428. Such a review may be appropriate, for example, where data is missing or could not be discerned by operators employed by the external data entry operator. If no review is needed, the verified electronic forms may be sent to transaction processing 260 or data storage 270.

Finally, FIG. 4 also illustrates that the order in which form data is operated on by the transmit 420, repackage 424, and internal data entry 428 processes may be dictated by the priority assigned in step 410. Processing in step 428 may also be prioritized or sorted according to the type of errors that could not be resolved by external data entry vendors in step 240. For instance, all errors resulting from missing data might be processed in step 428 only by internal data entry operators who are trained and equipped to reach applicants by telephone.

The specification and examples provided above should be considered exemplary only. It is contemplated that the appended claims will cover any other such embodiments or modifications as fall within the true scope of the invention.

What is claimed is:

1. A computer implemented method for converting forms to electronic format in a system adapted to process multiple different types of forms, comprising:
    (a) receiving forms, the forms including form code identifiers on the forms, the form code identifiers being provided by the form provider and not by an applicant completing the form;
    (b) reading the forms into electronic format based on computer-implemented character recognition;
    (c) determining the form code identifiers for the forms, the form code identifiers identifying a plurality of different types of forms corresponding to different financial products available to applicants;
    (d) assigning priorities to the forms based on the determination of the form code identifiers, wherein at least some of the assigned priorities for some forms are different from the assigned priorities for other forms;
    (e) routing the forms to different validation and repair systems based on the determined form code identifiers;
    (f) processing the forms for validation and repair according to a contingent workflow, the contingent workflow being based at least in part on priorities assigned to forms; and
    (g) making the form data available to a subsequent process.

2. The method of claim 1, wherein wherein the forms are subdivided into snippets forwarded to validation and repair systems such that at least some validation and repair systems perform validation and repair on snippets and not on the entirety of the form.

3. The method of claim 1, wherein step (a) of receiving comprises receipt of a form from a facsimile machine.

4. The method of claim 1, wherein step (b) of reading comprises image capture.

5. The method of claim 1, wherein step (b) of reading comprises at least one of optical character recognition and intelligent character recognition.

6. The method of claim 1, wherein step (f) of processing comprises a workflow contingent on the ability to identify the form code identifiers.

7. The method of claim 1, wherein step (f) of processing comprises a workflow contingent on the presence of a change of address.

8. The method of claim 1, wherein step (f) of processing according to a contingent workflow comprises processing forms as parsed snippets when the form code identifier can be determined, and processing forms as full images when the form code identifier can not be determined.

9. The method of claim 1, wherein step (f) of processing comprises a workflow contingent on the type of error in the form that has been read into electronic format based on computer-implemented character recognition.

10. The method of claim 1, wherein step (g) of making comprises a process that writes data to another location.

11. The method of claim 1, wherein step (g) of making comprises a process that allows data to be read from another location.

12. The method of claim 1, wherein step (g) of making comprises data sharing with a transaction.

13. The method of claim 12, wherein the transaction is review of credit card applications.

14. The method of claim 1, wherein step (g) of making comprises data sharing with a database.

15. The method of claim 1, wherein step (f) of processing comprises a workflow contingent on at least four (4) parameters including:

(1) the ability to determine the form code identifier;

(2) the assigned priority of a form;

(3) an indication of a change of address; and (4) an indicia of the type of error resulting from the reading step.

16. The method of claim 15, further wherein the step (f) of processing the forms according to a contingent workflow comprises a first review cycle by an external data entry validation and repair system and a second review cycle by an internal data entry validation and repair system.

17. The method of claim 16, wherein the second review cycle is performed contingent upon whether the first review cycle can resolve errors in reading the forms.

* * * * *